(12) United States Patent
Solar

(10) Patent No.: US 11,560,143 B2
(45) Date of Patent: Jan. 24, 2023

(54) VEHICULAR AUTONOMOUS PARKING SYSTEM USING SHORT RANGE COMMUNICATION PROTOCOLS

(71) Applicant: Magna Electronics Inc., Auburn Hills, MI (US)

(72) Inventor: Martin Solar, Erlenbach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 63 days.

(21) Appl. No.: 17/303,297

(22) Filed: May 26, 2021

(65) Prior Publication Data

US 2021/0370915 A1 Dec. 2, 2021

Related U.S. Application Data

(60) Provisional application No. 62/704,733, filed on May 26, 2020.

(51) Int. Cl.
*H04N 5/44* (2011.01)
*B60W 30/06* (2006.01)
*G08G 1/14* (2006.01)
*H04W 4/02* (2018.01)
*H04W 4/80* (2018.01)
(Continued)

(52) U.S. Cl.
CPC ............ *B60W 30/06* (2013.01); *G08G 1/146* (2013.01); *H04B 17/318* (2015.01); *H04W 4/025* (2013.01); *H04W 4/40* (2018.02); *H04W 4/80* (2018.02); *B60W 2556/50* (2020.02); *B60W 2556/60* (2020.02)

(58) Field of Classification Search
CPC ............ B60W 30/06; B60W 2556/50; B60W 2556/60; G08G 1/146; H04B 17/318; H04W 4/025; H04W 4/40; H04W 4/80
See application file for complete search history.

(56) References Cited

U.S. PATENT DOCUMENTS 5,550,677 A 8/1996 Schofield et al.
5,670,935 A 9/1997 Schofield et al.
5,949,331 A 9/1999 Schofield et al.
(Continued)

*Primary Examiner* — Munear T Akki
(74) *Attorney, Agent, or Firm* — Honigman LLP

(57) ABSTRACT

A vehicular communication system includes a wireless communication sensor at a vehicle equipped with the vehicular communication system for receiving wireless communication data from remote wireless communication devices. A global positioning system is operable to determine a geographical location of the vehicle. An electronic control unit (ECU) includes electronic circuitry and associated software that includes a processor for processing wireless communication data received by the wireless communication sensor and position information determined by the global positioning system. The ECU, responsive at least in part to determination that position information determined by the global positioning system is compromised, determines, via processing the received wireless communication data, distances to a plurality of the remote wireless communication devices. The ECU, responsive to determining the distances to the plurality of the remote wireless communication devices, determines a position of the vehicle relative to the plurality of the remote wireless communication devices.

20 Claims, 2 Drawing Sheets

(51) Int. Cl.
  *H04B 17/318*   (2015.01)
  *H04W 4/40*   (2018.01)

(56) References Cited

U.S. PATENT DOCUMENTS

| | | | |
|---|---|---|---|
| 6,690,268 B2 | 2/2004 | Schofield et al. | |
| 6,693,517 B2 | 2/2004 | McCarthy et al. | |
| 7,038,577 B2 | 5/2006 | Pawlicki et al. | |
| 7,580,795 B2 | 8/2009 | McCarthy et al. | |
| 7,720,580 B2 | 5/2010 | Higgins-Luthman | |
| 7,855,755 B2 | 12/2010 | Weller et al. | |
| 8,548,738 B1* | 10/2013 | Kadous | G01C 21/206 701/434 |
| 8,874,317 B2 | 10/2014 | Marczok et al. | |
| 9,729,636 B2 | 8/2017 | Koravadi et al. | |
| 9,773,413 B1 | 9/2017 | Li et al. | |
| 9,783,194 B2 | 10/2017 | Seo et al. | |
| 9,809,218 B2 | 11/2017 | Elie et al. | |
| 9,881,220 B2 | 1/2018 | Koravadi | |
| 9,944,282 B1 | 4/2018 | Fields et al. | |
| 9,981,657 B2 | 5/2018 | Joyce et al. | |
| 10,023,231 B2 | 7/2018 | Ramanujam | |
| 10,059,331 B2 | 8/2018 | Seo et al. | |
| 10,061,317 B2 | 8/2018 | Goldberg et al. | |
| 10,078,789 B2 | 9/2018 | Gupta et al. | |
| 10,086,870 B2 | 10/2018 | Gieseke et al. | |
| 10,214,206 B2 | 2/2019 | Latotzki | |
| 10,328,932 B2 | 6/2019 | Gieseke et al. | |
| 10,386,845 B1* | 8/2019 | Konrardy | G08G 1/166 |
| 2010/0152961 A1* | 6/2010 | Atri | G01C 21/26 701/31.4 |
| 2012/0062743 A1 | 3/2012 | Lynam et al. | |
| 2012/0197519 A1* | 8/2012 | Richardson | G01C 21/3647 701/508 |
| 2012/0218412 A1 | 8/2012 | Dellantoni et al. | |
| 2013/0222592 A1 | 8/2013 | Gieseke | |
| 2014/0218529 A1 | 8/2014 | Mahmoud et al. | |
| 2014/0354449 A1* | 12/2014 | Alam | G08G 1/164 340/902 |
| 2014/0375476 A1 | 12/2014 | Johnson et al. | |
| 2015/0124096 A1 | 5/2015 | Koravadi | |
| 2015/0149265 A1 | 5/2015 | Huntzicker et al. | |
| 2015/0158499 A1 | 6/2015 | Koravadi | |
| 2015/0251599 A1 | 9/2015 | Koravadi | |
| 2015/0344028 A1 | 12/2015 | Gieseke et al. | |
| 2015/0346727 A1 | 12/2015 | Ramanujam | |
| 2015/0352953 A1 | 12/2015 | Koravadi | |
| 2016/0036917 A1 | 2/2016 | Koravadi et al. | |
| 2016/0210853 A1 | 7/2016 | Koravadi | |
| 2016/0231133 A1 | 8/2016 | Johnson et al. | |
| 2016/0264132 A1 | 9/2016 | Paul et al. | |
| 2017/0008515 A1 | 1/2017 | Seo et al. | |
| 2017/0015312 A1 | 1/2017 | Latotzki | |
| 2017/0017847 A1 | 1/2017 | Nakaya | |
| 2017/0017848 A1 | 1/2017 | Gupta et al. | |
| 2017/0050672 A1 | 2/2017 | Gieseke et al. | |
| 2017/0132482 A1 | 5/2017 | Kim et al. | |
| 2017/0153714 A1 | 6/2017 | Gao et al. | |
| 2017/0253237 A1 | 9/2017 | Diessner | |
| 2017/0267233 A1 | 9/2017 | Minster et al. | |
| 2017/0313306 A1 | 11/2017 | Nordbruch | |
| 2017/0317748 A1 | 11/2017 | Krapf | |
| 2017/0329346 A1 | 11/2017 | Latotzki | |
| 2017/0365170 A1 | 12/2017 | Lazic et al. | |
| 2018/0072311 A1 | 3/2018 | Sham | |
| 2018/0107220 A1 | 4/2018 | Nordbruch | |
| 2018/0134315 A1 | 5/2018 | Marczok et al. | |
| 2018/0196429 A1 | 7/2018 | Goldberg et al. | |
| 2018/0201256 A1 | 7/2018 | Tseng et al. | |
| 2020/0043348 A1* | 2/2020 | Ghosh | G08G 5/0052 |
| 2020/0130676 A1 | 4/2020 | Smid | |
| 2020/0209886 A1* | 7/2020 | Lee | G01S 17/931 |
| 2020/0242924 A1* | 7/2020 | Publicover | G08G 1/087 |
| 2021/0155167 A1 | 5/2021 | Lynam et al. | |
| 2021/0270976 A1* | 9/2021 | Staats | G01S 1/68 |

* cited by examiner

VEHICULAR AUTONOMOUS PARKING SYSTEM USING SHORT RANGE COMMUNICATION PROTOCOLS

CROSS REFERENCE TO RELATED APPLICATION

The present application claims the filing benefits of U.S. provisional application Ser. No. 62/704,733, filed May 26, 2020, which is hereby incorporated herein by reference in its entirety.

FIELD OF THE INVENTION

The present invention relates generally to a vehicle communication system for a vehicle and, more particularly, to a vehicle communication system that utilizes one or more wireless sensors at a vehicle.

BACKGROUND OF THE INVENTION

Use of wireless communication sensors in vehicle communication systems is common and known. Examples of such known systems are described in U.S. Pat. Nos. 9,881,220 and 9,729,636, and U.S. Publication No. US-2015-0344028, which are hereby incorporated herein by reference in their entireties.

SUMMARY OF THE INVENTION

A communication system or parking system for a vehicle utilizes one or more wireless sensors (i.e., receivers and transmitters) to wirelessly communicate with remote wireless sensors or communication devices. The system includes an electronic control unit (ECU) that includes electronic circuitry and associated software. The electronic circuitry of the ECU includes a processor for processing wireless communication data captured by the wireless sensor to communicate with a remote wireless sensor. The system includes a global positioning system operable to determine a geographical location of the vehicle. The ECU, responsive at least in part to determination that position information determined by the global positioning system is compromised, determines, via processing received wireless communication data, distances to a plurality of the remote wireless sensors and, responsive to determining the distances to the plurality of the remote wireless sensors, determines a position of the vehicle. The ECU may communicate the determined position of the vehicle to a control system of the vehicle, such as an autonomous driving system or parking system of the vehicle.

These and other objects, advantages, purposes and features of the present invention will become apparent upon review of the following specification in conjunction with the drawings.

DESCRIPTION OF THE PREFERRED EMBODIMENTS

A vehicle communication system and/or driver or driving assist system and/or positioning system operates to communicate wirelessly with other vehicles and/or other objects in the environment in which a vehicle equipped with the vehicle communication system is travelling. The communication system includes a processor processing system that is operable to receive and transmit communication data to and from one or more wireless communication sensors (i.e., receivers and transmitters). The wireless communication sensors may be disposed in or at other vehicles or at stationary or fixed positions within the environment. The vehicle communication system communicates wirelessly with the wireless communication sensors (at one or more other vehicles or fixed positions within the environment) to determine a relative and/or absolute location of the equipped vehicle and/or the location of other vehicles and/or objects. Locations of the equipped vehicle and/or other vehicles and/or objects may be communicated to control systems (such as an autonomous driving or parking system) of the equipped vehicle to utilize the provided location information.

Figure 1:
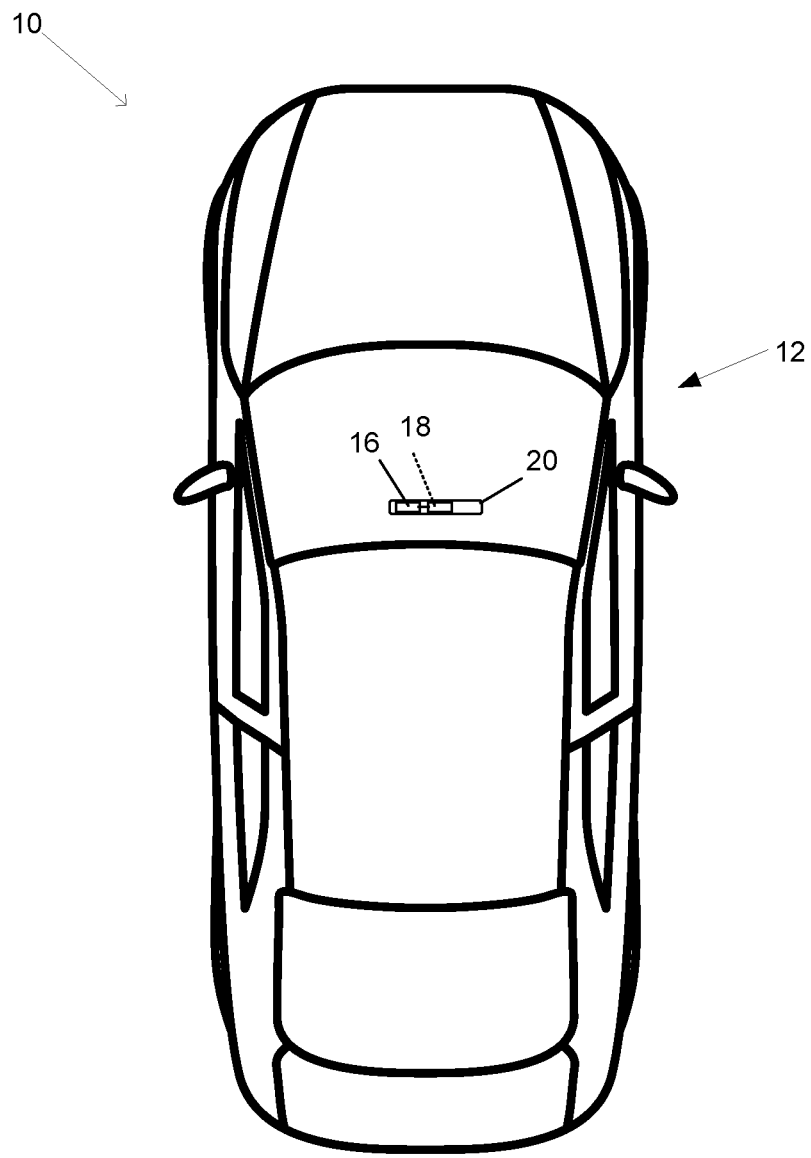
FIG. 1 is a plan view of a vehicle with a vision system that incorporates wireless sensors.

Referring now to the drawings and the illustrative embodiments depicted therein, a vehicle 10 includes a communication system or positioning system 12 that includes at least one wireless communication sensor 16 (such as a WI-FI sensor or BLUETOOTH sensor), which communicates wirelessly with another wireless sensor within range such as to determine a position of the equipped vehicle (FIG. 1). The communication system 12 includes a control or electronic control unit (ECU) 18 having electronic circuitry and associated software, with the electronic circuitry including a data processor that is operable to process wireless data transmitted or received by the wireless sensor 16, whereby the ECU may communicate wirelessly with other wireless communication sensors (e.g., other vehicles and/or stationary sensors positioned in the environment). The data transfer or signal communication from the wireless sensor to the ECU may comprise any suitable data or communication link, such as a vehicle network bus or the like of the equipped vehicle. The ECU may communicate processed data derived from the wireless data received by the wireless sensor such as to a driver of the vehicle (via display of information at a video display screen of the vehicle) or to a driver assist or autonomous driving or parking system of the vehicle to enhance maneuvering of the vehicle within the environment.

Typically, vehicles calculate their absolute position (i.e., a specific geographic location using, for example, longitude and latitude coordinates) based on Global Navigation Satellite Systems (GNSS). GNSS is most accurate when there is a stable connection link to a sufficient number of satellites. Many driving systems and vehicle functions, such as autonomous drive systems, require continuous and highly accurate positioning determinations to operate safely. However, in parking garages and similar environments that are obstructed or enclosed (e.g., underground) or otherwise provide poor connectivity to the satellites, GNSS is not an accurate positioning solution as the vehicle cannot obtain a suitable link to a sufficient number of satellites. Thus, autonomous vehicles (such as those with L4 autonomy or greater) instead typically calculate their position (e.g., in such scenarios where the GNSS system cannot obtain a suitable link) based on visual localization based on pre-generated high-definition (HD) maps of the area, visual localization based on available optical targets with exact known position, and differential positioning systems (e.g., a differential global positioning system (dGPS)) with a receiver in the vehicle in communication with base stations with known positions. The system described herein communicates with wireless communication sensors disposed within the environment to determine a position of the vehicle and communicates the determined position to a system of the vehicle, such as an autonomous driving system of the vehicle (for example, to maintain a stream of accurate position data to such a system).

Wireless communication protocols such as BLUETOOTH and WI-FI are commonly available on vehicles for connecting with mobile phones and other user devices. Implementations herein include a vehicle communication system that enables accurate indoor positioning of vehicles using existing wireless communication protocols to communicate with wireless devices commonly present in (or that may be disposed in) environments that may have poor GNSS connectivity (such as parking garages or other enclosed areas) to determine a more accurate position of the vehicle The wireless communication sensors (e.g., that transmit BLUETOOTH or WI-FI) signals are more localized than traditional positioning transmitters and are commonly disposed in high density in areas with poor GNSS connectivity and thus provide a more reliable and accurate source from which to derive position information. Furthermore, the system may determine the location of other vehicle and/or objects in the environment to, for example, enable parking spot occupancy reporting where the system may learn or determine the location of free parking spots through communications sent and received by the wireless communication sensor and/or processing of received data at the ECU.

Figure 2:
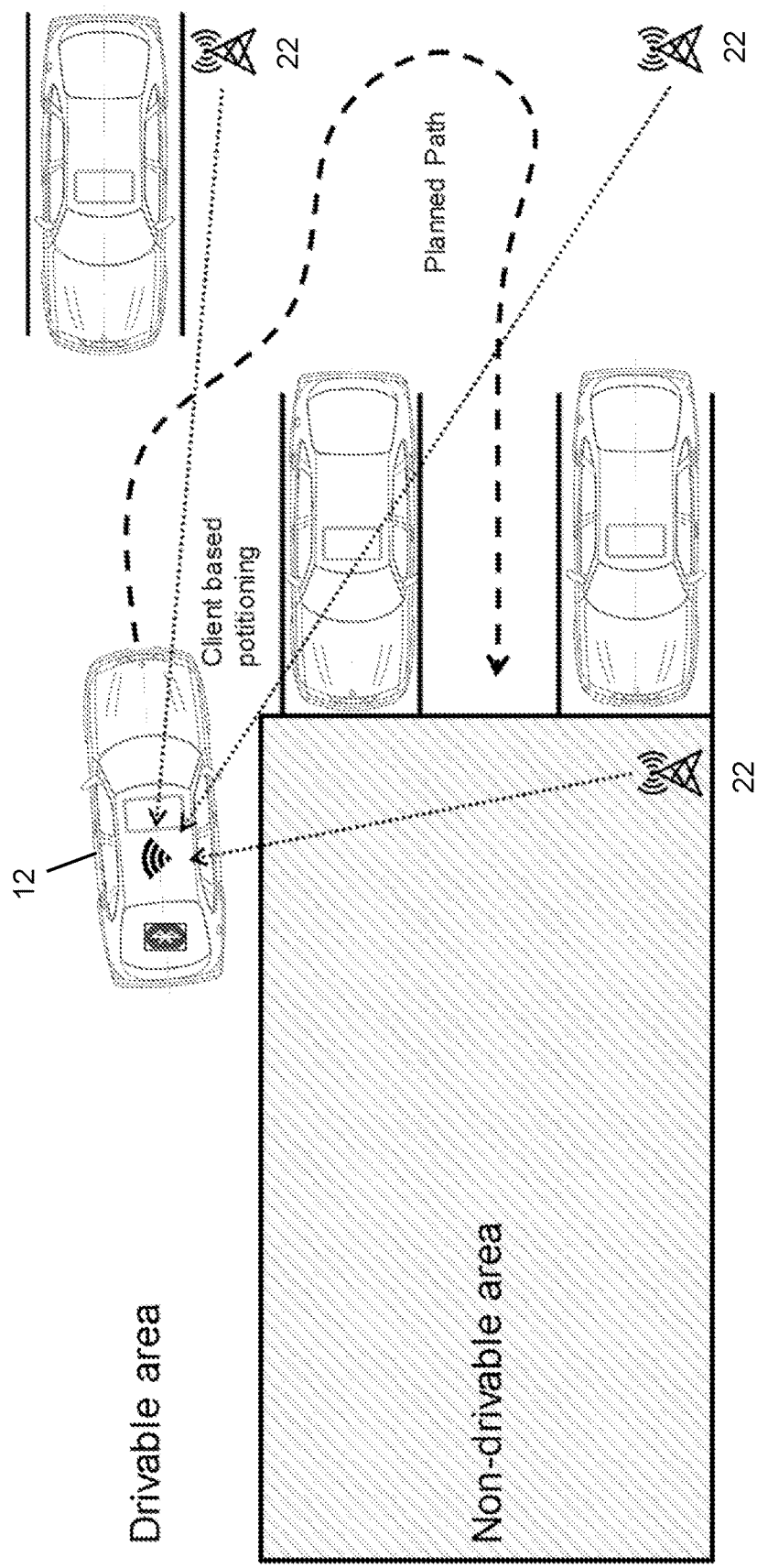
FIG. 2 is a schematic view of a vehicle obtaining its position using wireless sensors.

Referring now to FIG. 2, a vehicle 10 equipped with the communication system 12 is shown in a parking environment such as a parking garage. A plurality of wireless communication sensors 22 are disposed within the parking environment, such as disposed within other vehicles and/or at stationary locations around the parking environment. The position of at least a portion of the plurality of wireless sensors 22 within the environment is known, such as via a location communicated with the wireless communication from the sensor. For example, another vehicle that is parked within the garage may have a more accurate GNSS position than the equipped vehicle travelling through the garage and may communicate that known position via its wireless communication.

The plurality of wireless communication sensors 22 within the environment transmit wireless communications that may be received by the wireless communication sensor 16 of the equipped vehicle when it is in range. The ECU may process the wireless signals received by the wireless communication sensor 16 to determine a signal strength of the wireless communication received from each sensor 22. Based on measured signal strength to at least a portion of the plurality of wireless sensors, the vehicle may determine its position relative to the portion of wireless sensors. That is, because the strength of a wireless signal is correlated with distance, the vehicle may estimate a distance from the sensor based on the signal strength. The vehicle may also use other calculations such as time-of-flight. Alternatively, the position of one or more of the sensors 22 may be predetermined and stored at the vehicle on at a remote server in wireless communication with the vehicle. Because the position of at least a portion of the wireless sensors is known, the vehicle may use the relative position of the vehicle with respect to the plurality of wireless sensors to determine an absolute position of the vehicle.

Generally, wireless signals, such as those transmitted over BLUETOOTH and WI-FI networks, do not include values indicating the distance of the receiver from the transmitter. However, the signal strength may be analyzed (using calculations to account for obstacles) to determine the distance of the receiver from a transmitter with a known location. For example, the wireless communication sensor 16 may receive signals from a plurality of sensors 22 within the environment with different signal strengths. A weaker signal strength may indicate a sensor 22 is further from the equipped vehicle while a stronger signal strength may indicate a sensor 22 is closer to the equipped vehicle. Based on the signal strength, the system may determine the vehicle's relative position to the sensors. The ECU may also perform advanced wireless positioning calculations using the wireless communications received by the sensor 16 from sensors 22 with known locations. For example, the system may perform lateration or fingerprinting positioning techniques to determine an absolute position of the vehicle. The system may also determine the vehicle's relative position and the vehicle's absolute position and combine the outcomes, such as using a Kalman filter, to provide a more reliable and more accurate positioning determination.

The system may then communicate the determined position to an autonomous or semi-autonomous driving system of the vehicle to enhance the driving system's ability to recognize the position of the vehicle when traditional (GNSS) positioning systems have diminished operation. Optionally, the system may be used to supplement the position information received from a GNSS connected to the vehicle. Satellite-based location methods are not always totally inoperable when a vehicle is travelling within an obstructed environment (parking garage), but may still experience degraded capabilities due to weak or delayed or intermittent signals. The position determined via wireless communication between the wireless sensor at the vehicle and the wireless sensor within the environment may supplement or otherwise correct inaccurate, incomplete, unstable, or unusable GNSS position information to provide increasingly accurate position information. The system may also determine that the GNSS position information is inaccurate and, responsive to such a determination, communicate with wireless communication sensors in the environment to improve the accuracy of position information.

Additionally, when the position of vehicles within the parking environment is known (such as via communication of wireless communication sensors of the vehicles), and when the position of one or more parking spaces within the parking environment is known, a parking system (such as a central parking system) or the communication system may determine which parking spaces are vacant and which are occupied, thus allowing the driver or the vehicle to navigate quicker to a vacant parking space. For example, the system may receive communications from wireless communication sensors at other vehicles within the environment and from sensors at locations in the environment corresponding to parking spots. The system may compare the locations of known parking spots to determine locations of other vehicles to determine whether parking spots are occupied or not and communicate a signal to the driver and/or vehicular system to guide the vehicle to an unoccupied parking spot. The system thus may determine the position of the vehicle within the environment using the wireless communications with remote wireless communication sensors and communicate the determined position to a system of the vehicle such as to guide the vehicle into a parking space or maneuver the vehicle within the environment.

The system may continuously receive and process wireless communications or the system may begin processing wireless communication data responsive to a signal from a vehicle system and/or responsive to a user input. For example, a system of the vehicle (such as an autonomous driving system) may be using position data from a GNSS in communication with the vehicle and determine that the GNSS-provided position information is inaccurate and thus communicate a signal to the ECU to process wireless communication data to supplement or provide more accurate position information to the vehicular system. Additionally, a vehicle may enter a parking garage and begin processing communication data to determine unoccupied parking spots such as responsive to a user input requesting the location of available parking spots or responsive to a signal (such as from GPS) that the vehicle has entered the parking garage.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the communication system may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular communication system, the vehicular communication system comprising:
    a wireless communication sensor disposed at a vehicle equipped with the vehicular communication system for receiving wireless communication data from remote wireless communication devices;
    an electronic control unit (ECU) comprising electronic circuitry and associated software;
    a global positioning system operable to determine a geographical location of the vehicle;
    wherein the electronic circuitry of the ECU comprises at least one processor for processing (i) wireless communication data received by the wireless communication sensor and (ii) position information determined by the global positioning system;
    wherein the ECU, responsive at least in part to determination that position information determined by the global positioning system is not accurate, determines, via processing received wireless communication data, distances to a plurality of the remote wireless communication devices disposed at a parking facility;
    wherein the ECU, responsive to determining the distances to the plurality of the remote wireless communication devices, determines a position of the vehicle relative to the plurality of the remote wireless communication devices;
    wherein the remote wireless communication devices are disposed at (i) structure of the parking facility, and (ii) other vehicles at the parking facility;
    wherein the ECU, responsive to processing by the at least one processor of received wireless communication data, determines an occupancy of one or more parking locations at the parking facility; and
    wherein the ECU communicates the determined position of the vehicle and the determined occupancy of the one or more parking locations to an autonomous parking system of the vehicle.

2. The vehicular communication system of claim 1, wherein the ECU determines the distance to a respective remote wireless communication device of the plurality of the remote wireless communication devices based at least in part on a signal strength of the wireless communication data received by the wireless communication sensor from the respective remote wireless communication device.

3. The vehicular communication system of claim 1, wherein the ECU receives position data pertaining to at least one of the plurality of the remote wireless communication devices, and wherein the ECU, responsive to receiving the position data of the at least one of the plurality of the remote wireless communication devices and responsive to determining the distance to the plurality of the remote wireless communication devices, determines an absolute position of the vehicle.

4. The vehicular communication system of claim 1, wherein the autonomous parking system of the vehicle, based on the determined position of the vehicle, determines a path for the vehicle to follow to maneuver the vehicle into a parking space.

5. A vehicular communication system, the vehicular communication system comprising:
a wireless communication sensor disposed at a vehicle equipped with the vehicular communication system for receiving wireless communication data from remote wireless communication devices;
an electronic control unit (ECU) comprising electronic circuitry and associated software;
a global positioning system operable to determine a geographical location of the vehicle;
wherein the electronic circuitry of the ECU comprises at least one processor for processing (i) wireless communication data received by the wireless communication sensor and (ii) position information determined by the global positioning system;
wherein the ECU, responsive at least in part to determination that position information determined by the global positioning system is not accurate, determines, via processing received wireless communication data, distances to a plurality of the remote wireless communication devices disposed at a parking facility;
wherein the ECU determines the distance to a respective remote wireless communication device of the plurality of the remote wireless communication devices based at least in part on a signal strength of the wireless communication data received by the wireless communication sensor from the respective remote wireless communication device;
wherein the ECU, responsive to determining the distances to the plurality of the remote wireless communication devices, determines a position of the vehicle relative to the plurality of the remote wireless communication devices;
wherein the remote wireless communication devices are disposed at (i) structure of the parking facility, and (ii) other vehicles at the parking facility;
wherein the ECU, responsive to processing by the at least one processor of received wireless communication data, determines an occupancy of one or more parking locations at the parking facility;
wherein the ECU communicates the determined position of the vehicle and the determined occupancy of the one or more parking locations to an autonomous parking system of the vehicle; and
wherein the ECU communicates the determined position of the vehicle to an autonomous parking system of the vehicle.

6. The vehicular communication system of claim 5, wherein the ECU receives position data pertaining to the plurality of the remote wireless communication devices, and wherein the ECU, responsive to receiving the position data of the plurality of the remote wireless communication devices and responsive to determining the distance to the respective remote wireless communication device, determines an absolute position of the vehicle.

7. The vehicular communication system of claim 5, wherein the autonomous parking system of the vehicle, based on the determined position of the vehicle, determines a path for the vehicle to follow to maneuver the vehicle into a parking space.

8. A vehicular communication system, the vehicular communication system comprising:
a wireless communication sensor disposed at a vehicle equipped with the vehicular communication system for receiving wireless communication data from remote wireless communication devices;
an electronic control unit (ECU) comprising electronic circuitry and associated software;
a global positioning system operable to determine a geographical location of the vehicle;
wherein the electronic circuitry of the ECU comprises at least one processor for processing (i) wireless communication data received by the wireless communication sensor and (ii) position information determined by the global positioning system;
wherein the ECU, responsive at least in part to determination that position information determined by the global positioning system is not accurate, determines, via processing received wireless communication data, distances to a plurality of the remote wireless communication devices disposed at a parking facility;
wherein the ECU, responsive to determining the distances to the plurality of the remote wireless communication devices, determines a position of the vehicle relative to the plurality of the remote wireless communication devices;
wherein the remote wireless communication devices are disposed at at least one selected from the group consisting of (i) structure of the parking facility, and (ii) other vehicles at the parking facility;
wherein the ECU, responsive to processing by the at least one processor of received wireless communication data, determines an occupancy of one or more parking locations at the parking facility; and
wherein the ECU communicates the determined position of the vehicle and the determined occupancy of the one or more parking locations to an autonomous parking system of the vehicle.

9. The vehicular communication system of claim 8, wherein the wireless communication sensor comprises a BLUETOOTH sensor.

10. The vehicular communication system of claim 8, wherein the wireless communication sensor comprises a WI-FI sensor.

11. The vehicular communication system of claim 8, wherein the vehicle is located at an underground parking facility, and wherein the position information determined by the global positioning system is not accurate because of the underground parking facility.

12. The vehicular communication system of claim 11, wherein the plurality of the remote wireless communication devices are disposed at structure of the parking facility.

13. The vehicular communication system of claim 8, wherein the plurality of the remote wireless communication devices are disposed at other vehicles.

14. The vehicular communication system of claim 8, wherein the ECU communicates the determined position of the vehicle and the determined occupancy of the one or more parking locations to an autonomous driving system of the vehicle.

15. The vehicular communication system of claim 14, wherein the autonomous driving system of the vehicle, based on the determined position of the vehicle, determines a path for the vehicle to follow to maneuver the vehicle relative to the remote wireless communication devices.

16. The vehicular communication system of claim 8, wherein the ECU determines that position information determined by the global positioning system is not accurate when the position information determined by the global positioning system has degraded below a threshold level.

17. The vehicular communication system of claim 8, wherein the ECU determines the distance to the plurality of the remote wireless communication devices responsive to a user input.

18. The vehicular communication system of claim 8, wherein the ECU determines the distance to a respective remote wireless communication device of the plurality of the remote wireless communication devices based at least in part on a signal strength of the wireless communication data received by the wireless communication sensor from the respective remote wireless communication device.

19. The vehicular communication system of claim 18, wherein the ECU receives position data pertaining to the plurality of the remote wireless communication devices, and wherein the ECU, responsive to receiving the position data of the plurality of the remote wireless communication devices and responsive to determining the distance to the respective remote wireless communication device, determines an absolute position of the vehicle.

20. The vehicular communication system of claim 8, wherein the autonomous parking system of the vehicle, based on the determined position of the vehicle, determines a path for the vehicle to follow to maneuver the vehicle into a parking space.

\* \* \* \* \*